United States Patent [19]

Redner

[11] Patent Number: 5,593,481
[45] Date of Patent: Jan. 14, 1997

[54] ACTIVATED CARBON AIR PURIFIER

[75] Inventor: Carl R. Redner, Walled Lake, Mich.

[73] Assignee: General Filters, Inc., Novi, Mich.

[21] Appl. No.: 533,452

[22] Filed: Sep. 25, 1995

[51] Int. Cl.[6] .................................................. B01D 53/04
[52] U.S. Cl. ............................. 96/132; 96/138; 96/147; 96/151; 55/270; 55/515
[58] Field of Search .................... 96/108, 121, 131–133, 96/138, 147, 151; 55/515, 517, 270

[56] References Cited

U.S. PATENT DOCUMENTS

| | | | |
|---|---|---|---|
| 1,261,767 | 4/1918 | Cheney et al. | 96/121 |
| 1,716,480 | 6/1929 | Bilsky | 96/121 |
| 2,214,737 | 9/1940 | Dauphinee | 96/133 |
| 2,303,332 | 12/1942 | Dauphinee | 96/129 |
| 2,536,274 | 1/1951 | Gaugler | 96/108 X |
| 2,589,229 | 3/1952 | Dauphinee | 96/129 |
| 2,881,854 | 4/1959 | Uehre, Jr. | 96/138 |
| 3,319,401 | 5/1967 | Bogardus | 96/151 X |
| 3,581,476 | 6/1971 | Rivers | 96/129 |
| 3,616,604 | 11/1971 | Schouw | 55/515 X |
| 3,861,894 | 1/1975 | Marsh | 96/121 |
| 3,912,472 | 10/1975 | Marble | 96/133 |
| 3,969,095 | 7/1976 | Kurahashi | 96/133 |
| 5,290,345 | 3/1994 | Osendorf et al. | 96/129 |

FOREIGN PATENT DOCUMENTS

| | | | |
|---|---|---|---|
| 2548040 | 1/1985 | France | 96/121 |
| 62-183838 | 8/1987 | Japan | 96/132 |
| 1-090017 | 4/1989 | Japan | 96/133 |
| WO94/29001 | 12/1994 | WIPO | 96/108 |

Primary Examiner—Robert Spitzer
Attorney, Agent, or Firm—Dykema Gossett PLLC

[57] ABSTRACT

The air purifier is used in a forced air heating and cooling system. It includes a cabinet assembly having therein a removable adsorber media carrier assembly. The carrier assembly includes a plurality of removable and refillable adsorber tubes provided with pelletized activated carbon or other adsorption media. The adsorber tubes are made from wire mesh and are arranged in rows with the air flowing through the cabinet assembly striking and impinging on the adsorber tubes in order to purify the air.

15 Claims, 5 Drawing Sheets

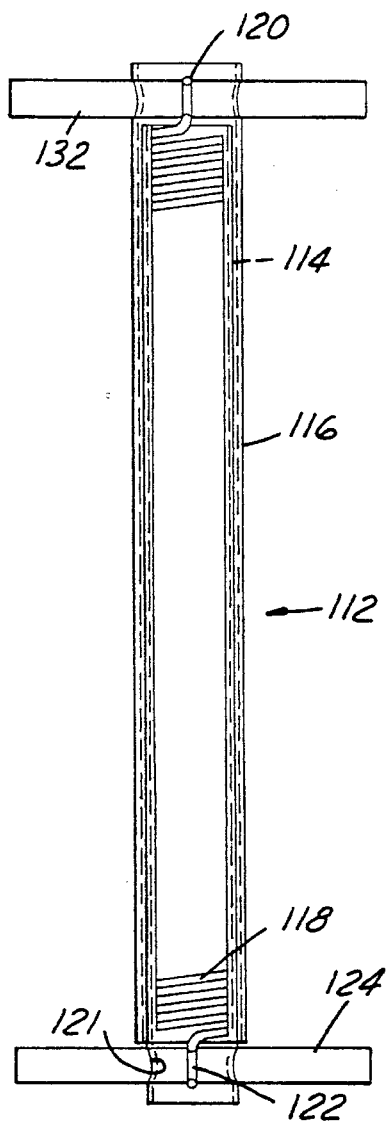
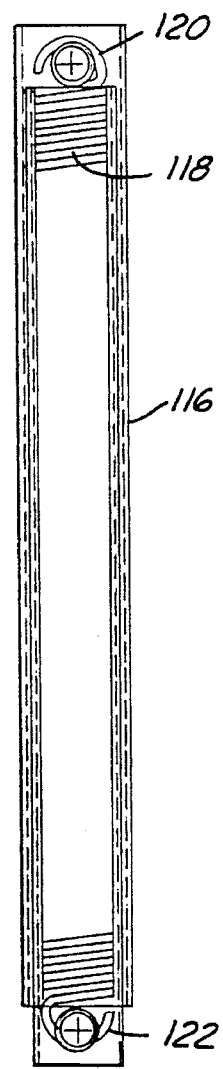
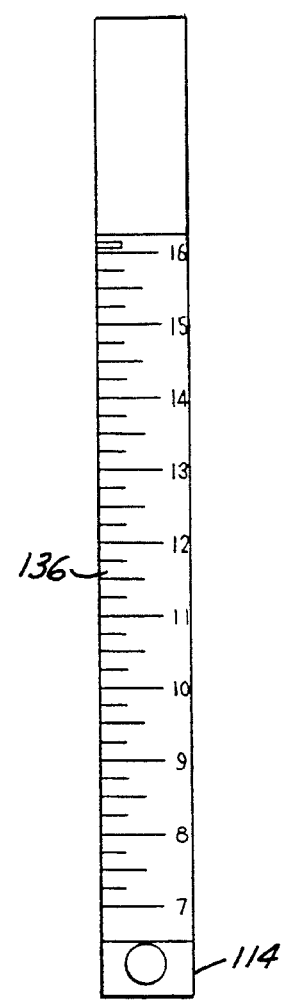
FIG.16    FIG.15    FIG.14
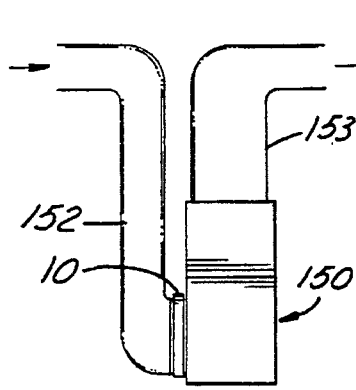
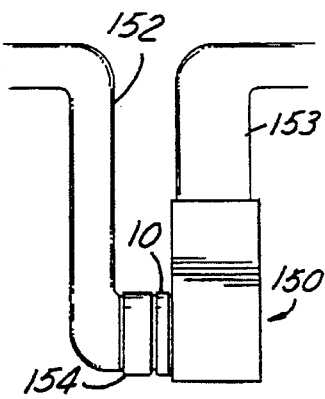
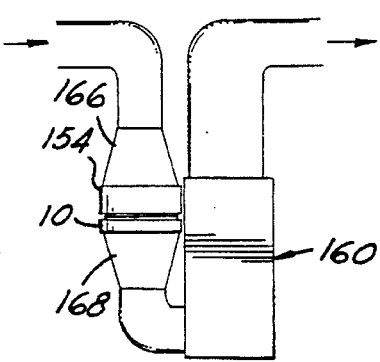
FIG.17    FIG.18    FIG.19

ACTIVATED CARBON AIR PURIFIER

BACKGROUND OF THE INVENTION

1. Field of the Invention

This invention relates to an air purifier and in particular to an activated carbon air purifier. More specifically it relates to a purifier which utilizes rows of woven wire cloth adsorber tubes containing the activated carbon. With such a construction, the adsorber tubes are refillable after a heating or cooling season of use. In such a construction, the adsorber tubes are staggered so that the air moving in the duct of the forced air heating and cooling system always impinges on an adsorber tube before exiting the air purifier. The staggered positioning results in low resistance to air flow.

2. Description of the Prior Art

Activated carbon air adsorbers have been constructed for industrial purposes, utilizing steel tubes and frames with carbon granules. Such devices have not been of a size or constructed for use in the return air duct of a residential forced air heating and cooling system. The prior art further contains carbon adsorbers utilizing carbon granules attached to a foam or fibrous pad. These designs remove only small quantities of pollutant due to the limited amount of carbon they contain. The prior art also shows packed-bed or "v-bank" adsorbers which usually exhibit high resistance to air flow and therefore are not suited to residential heating and cooling systems.

SUMMARY OF THE PRESENT INVENTION

In general terms this invention relates to an air purifier for use in a forced air heating and cooling system which utilizes activated carbon or other granular adsorbents as the purifying media. The air purifier contains a cabinet assembly having a front side, a rear side and a peripheral frame, with the front and rear sides being open to permit air to flow therethrough. The air purifier further includes a carbon adsorption media carrier assembly located within the cabinet assembly between the front and rear sides to intercept and clean the air flowing through the cabinet assembly. The carbon adsorption media carrier assembly comprises a frame having a pair of parallel and spaced apart rails each having a pair of end portions and a pair of parallel and spaced apart tube carrying members located, respectively, between the end portions of the rails.

In the preferred embodiment, the tube carrying members each have a pair of rows of tubular sockets, with the tubular sockets of one row of the one tube carrying member being aligned with the tubular sockets in one row of the other tube carrying members and the tubular sockets of the other row of the one tube carrying member being aligned with the tubular sockets in the other row of the other tube carrying member. The preferred embodiment further includes a plurality of adsorber tubes, each of generally the same length, made from porous material such as woven wire cloth and adapted to carry pelletized activated carbon. The adsorber tubes have the ends thereof carried by the rows of aligned tubular sockets and the tubes in each row are spaced apart in a direction which is perpendicular to the rails. The air flowing through the cabinet assembly strike and impinge on the adsorber tubes and carbon columns within the tubes in order to purify the air.

The air purifier of the present invention further includes as part of the carbon media adsorption carrier assembly an integral spring weighing scale or mechanism. This permits the user of the air purifier to weigh the carbon media carrier assembly before use and after use in order to determine the amount of contaminant adsorbed by the activated carbon columns within the adsorber tubes.

These and other features and objects of this invention will become apparent to those skilled in the art in the following detailed description of the preferred embodiment together with the accompanying drawings, the following being a brief description of the latter.

BRIEF DESCRIPTION OF THE PATENT DRAWINGS

FIG. 14 is an elevational view of the inner cylinder of the scale mechanism and illustrating the graduations provided thereon;

FIG. 15 is an elevational view of the scale mechanism showing the spring surrounded by an inner cylinder and an outer cylinder;

FIG. 16 is an elevational view taken and the ends anchored generally on the center line of the spring and cylinders of FIG. 15;

FIG. 17 is a fragmentary view of a furnace provided with a carbon air purifier;

FIG. 18 is a fragmentary view of-a furnace provided with a carbon air purifier and a particulate filter located upstream of the carbon air purifier; and FIG. 19 is a fragmentary view of another arrangement of a carbon air purifier and a particulate filter in the duct leading to the furnace.

DETAILED DESCRIPTION OF THE PREFERRED EMBODIMENT

Figure 1:
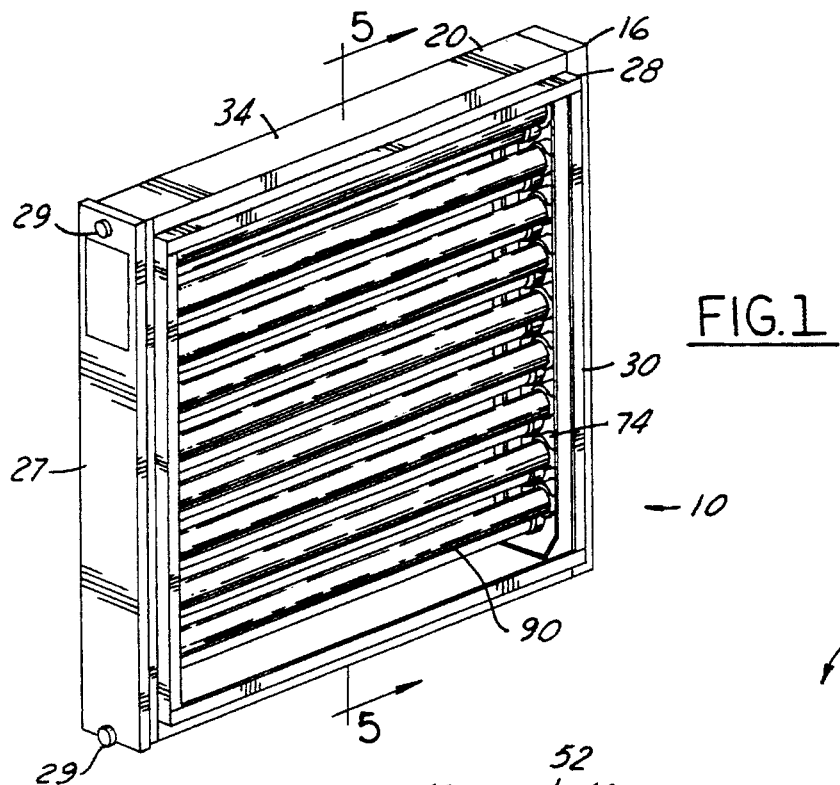
FIG. 1 is a perspective view of the air purifier.

Referring now to the drawings, the activated carbon air purifier is designated by the numeral "10". This includes two major assemblies including the air purifier cabinet assembly 12 and an adsorber media carrier assembly 14.

The air purifier cabinet assembly 12 includes a peripheral frame 16 having a pair of side channel members 18 and 20 and a channel member 22 connecting the ends of members 18 and 20 together. The opposite ends of the channel members 18 and 20 are connected by straps 22 and 24 to provide an entrance opening 25 for the insertion of the adsorber media carrier assembly 14. A cover 27 closes the opening 25. Thumb screws 29 secures the cover to frame 16. The cabinet assembly 12 is provided with a rectangular frame 28 at the front side 30 of the cabinet assembly 12 and a similar rectangular frame 32 at the rear side 34 of the cabinet 12. The front and rear sides of the cabinet assembly 12 are open to permit air flow through the cabinet 12. The cabinet assembly 12 is made from various metal channels and angle members to provide the desired configuration. The elements are connected by welding or by riveting as is well known in the art.

The adsorber carrier assembly 14 has a frame 40 which includes a pair of channels 42, 44. Each channel has a base 46 and a pair of flanges 48, 50. The flanges 48 and 50 of one channel member 42 extend in an opposite direction from the corresponding flanges 48 and 50 of the other channel member 44. Opposite end portions of channel members 42, 44 are provided with four holes 52 for fastening purposes as will subsequently appear. The channel members 42, 44 are made from metal.

The frame 40 of the adsorber carrier assembly 14 further includes a pair of tube carrying members 60 and 62 which are made from plastic material such as nylon or other suitable material. Tube carrying members 60 and 62 are each provided with end flanges 64 having four openings 66. The openings 66 are spaced apart from one another in the same arrangement or pattern as the openings 52 provided in the members 42 and 44.

Figure 2:
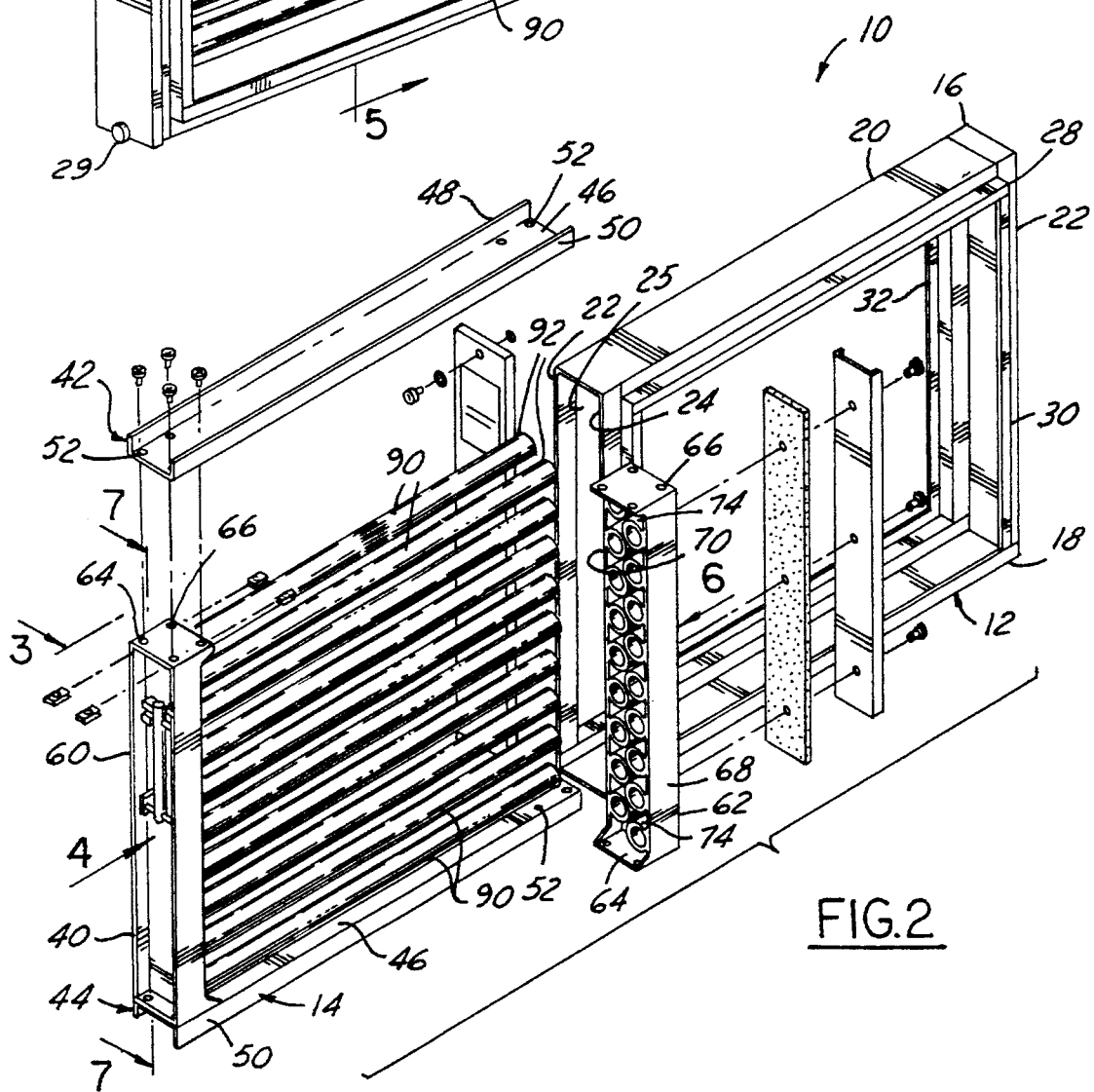
FIG. 2 is an exploded view of the air purifier shown in FIG. 1 with the parts separated to show the interior thereof.

Tube carrying member 62 is provided with a front wall 68, a back wall 70 and a bottom or connecting wall 72. The bottom or connecting wall 72 is provided with two rows of tubular supports 74 which are spaced apart vertically and horizontally as shown in FIG. 2. The centers of the tubular supports 74 are staggered. Thus one row 76 of tubular support 74 are provided alone one of the walls 68 while the other row 78 of tubular support 74 are provided along the other wall 70 as shown in FIG. 6.

Figure 6:
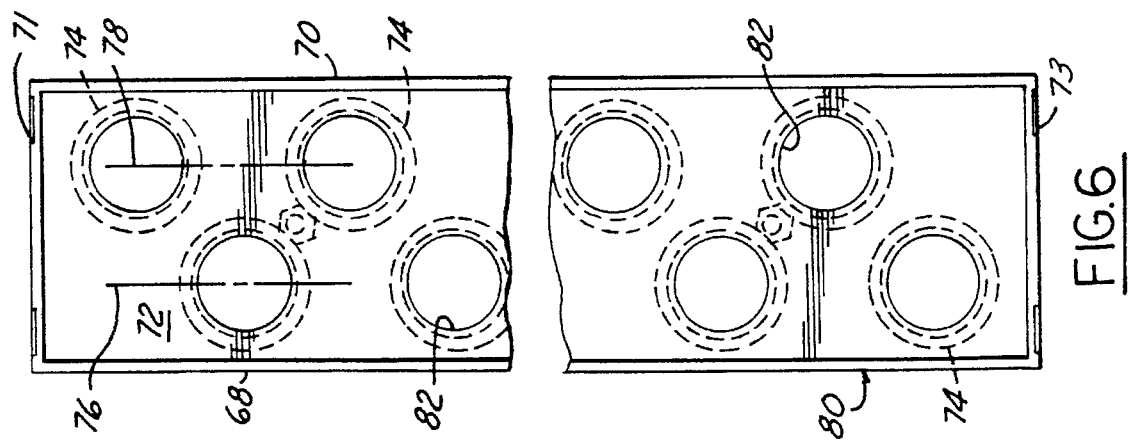
FIG. 6 is an elevational view of a tube carrying member, with parts broken away, looking in the direction of arrow 6 of FIG. 2.

The tube carrying member 62 as viewed in FIG. 6 illustrate the staggered relationship between the tubular supports 74 provided in rows 76 and 78. The bottom wall 72 is surrounded by the side walls 68, 70 and end walls 71, 73 which form a continuous or generally rectangular trough 80 as best shown in FIG. 6. The trough 80 has a height of approximately ⅞ inch with the bottom wall 72 having therein openings 82, one for each of the tubular sockets 74.

Figure 3:
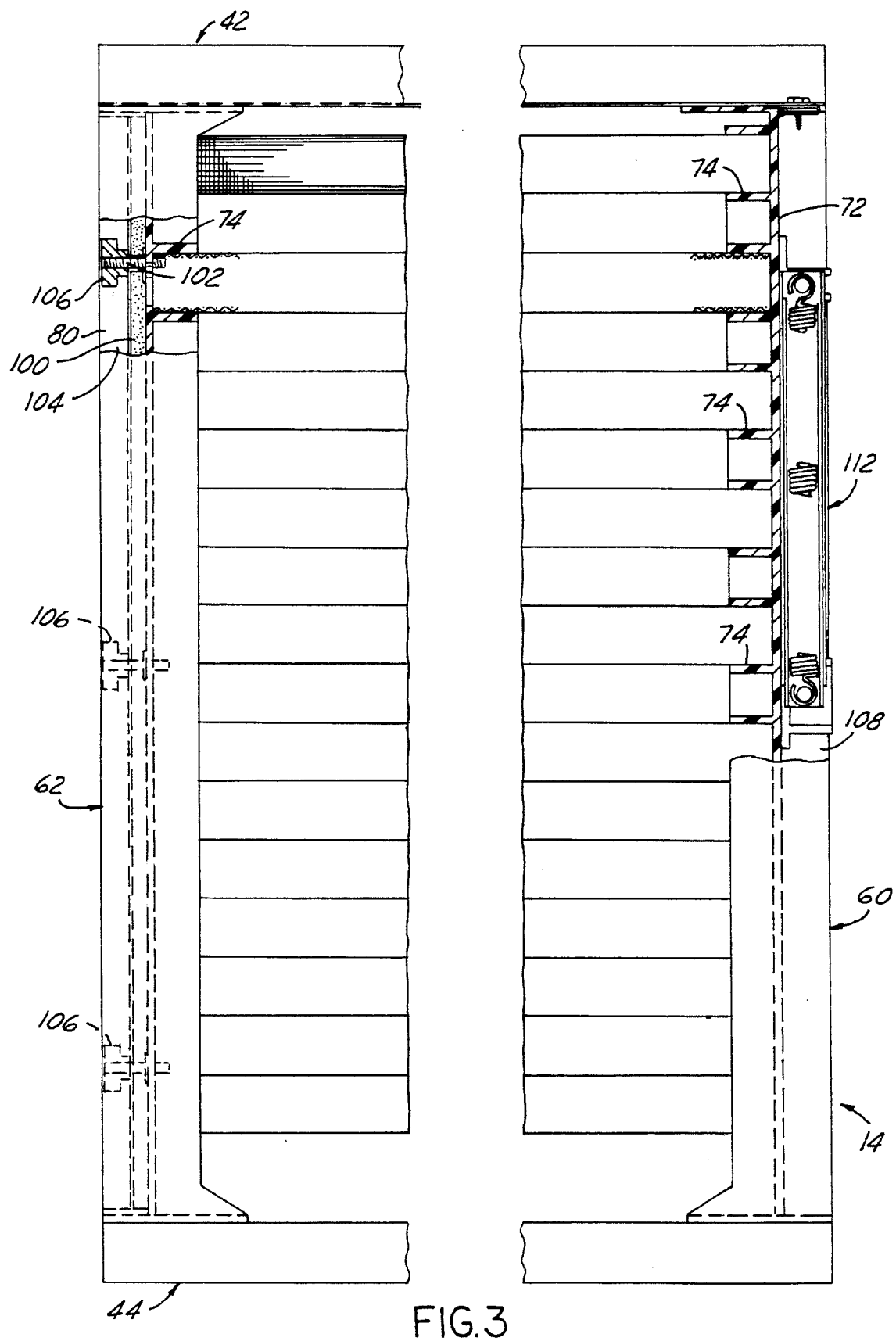
FIG. 3 is a rear elevational view of the carbon adsorption media carrier assembly, taken on line 3 of FIG. 2, with certain parts broken away and in section to illustrate certain features of the invention.
Figure 5:
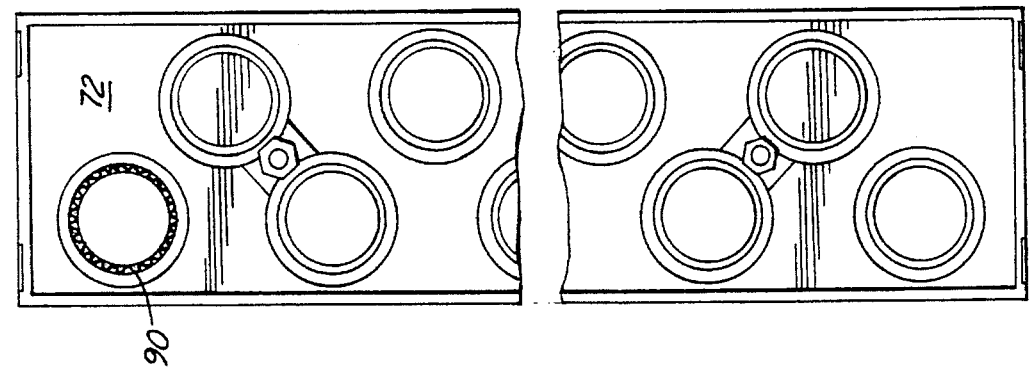
FIG. 5 is a sectional view taken along the 5—5 of FIG. 1, with certain portions broken away.

The tube carrying member 60 is also provided with the same number of staggered tubular sockets 74 as the tube carrying member 62 as shown in FIG. 3. In FIG. 6 each row 76, 78 of each of the tube carrying members 60, 62 has, as an example, nine tubular supports 74. The corresponding tubular sockets 74 of each tube carrying member 60/62 is provided with one end 92 of an adsorber tube 90. The ends 92 of each adsorber tube 90 are received in a pair of aligned tubular sockets 74. The tubular adsorber tubes 90 are made from woven wire cloth having a mesh rating of 30 to 40 mesh. The tubes 90, as shown in FIGS. 5 and 6, are arranged vertically apart in two rows 76, 78 with the tubes 90 in one row being located behind the spaces of the tubes 90 in the other row. When the tubes 90 are viewed from the front or the back of the air purifier 10 they appear to present a continuous wire mesh screen so that air entering the air purifier 10 will strike and impinge upon one of the tubes 90 in either row 76 or 78.

The trough 80 is used to fill the tubes 90 with activated carbon. The activated carbon is placed in the trough 80 and the person uses a brush or his or her fingers to introduce the activated carbon particles into the tubes 90 through the entrance openings 82 until the tubes are filled. Once all the tubes 90 are filled a seal or gasket 100 is placed in the trough 80 over three mounting studs 102. Thereafter a cover 104 is placed in the trough 80 against the seal 100 and secured to the studs 102 by means of the threaded nuts 106.

Figure 7:
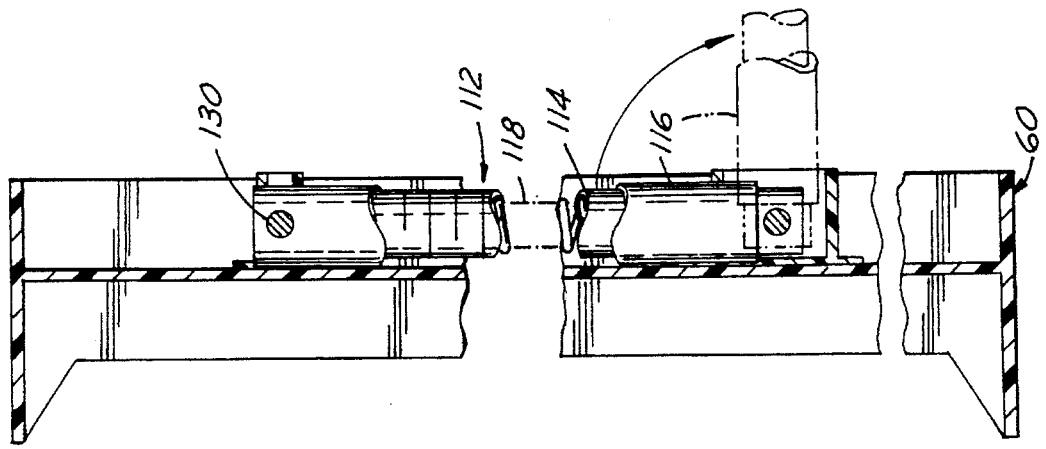
FIG. 7 is a sectional view taken on the line 7—7 of FIG. 2 and illustrating the scale mechanism in a folded position and in an operative position as represented by the dotted lines.
Figure 4:
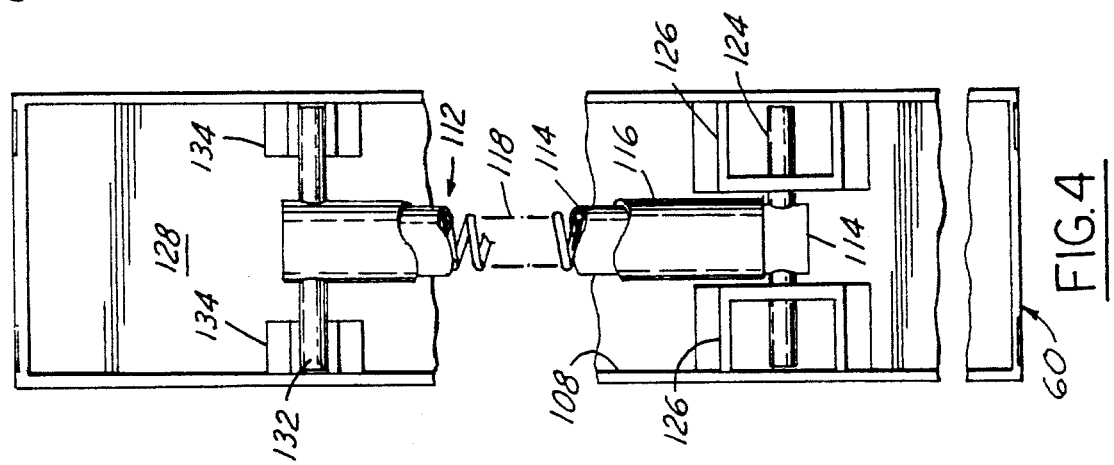
FIG. 4 is a fragmentary view of the scale mechanism, with parts broken away and looking in the direction of arrow 4 of FIG. 2.

The other tube carrying member 60 is also provided with a continuous trough 108 in which is located a spring weighing scale 112. The spring weighing scale 112 includes an inner cylinder 114 and an outer cylinder 116. A coiled spring 118 having ends 120 and 122 is located within the inner cylinder 114. The inner cylinder 114 has an opening 121 to which extends a pivot rod or mounting 124. The pivot mounting 124 is carried by a pair of laterally spaced apart lugs 126 which are secured to the base or bottom 128 of the tube carrying member 60. The outer cylinder 116 has an opening 130 through which extends a handle 132. When the spring weighing scale 112 is not in use, the cylinders 114, 116 are collapsed and are held against the base 130 of the tube carrying member 60. When it is required to use the weighing device 112, the handle 132 is removed from the lugs 134 and the weighing device 112 is pivoted about the pivot rod 126 and is moved to the dotted position as shown in FIG. 7. The spring end 122 is wrapped around the pivot rod 124 while the other end 120 of the spring 118 is wrapped around the handle 132. The inner cylinder 114 is provided with a graduated scale 136 as shown in FIG. 14 which permits the carrier assembly 14 to be weighed in the manner shown in FIG. 12. The weighing takes place before and after use of the carrier assembly 14. The weighing before use establishes the weight of carrier assembly before the adsorbant is exposed to contaminant. The weighing after use establishes the weight of the carrier assembly and the adsorbed contaminant. Using subtraction, the weight of the contaminant and the remaining capacity of the adsorption media can be determined.

Figure 8:
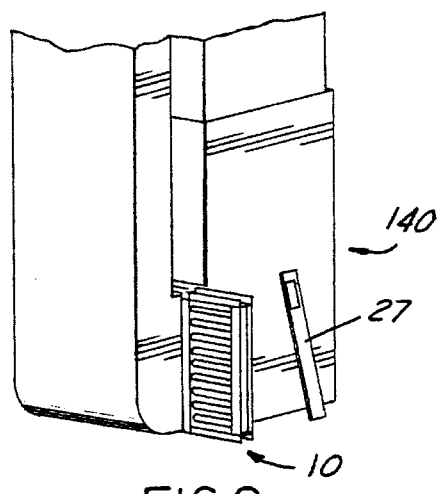
FIG. 8 is a fragmentary perspective view of a furnace with the cover of the air purifier removed and the media carrier assembly partially removed from the air cleaner cabinet assembly.
Figure 9:
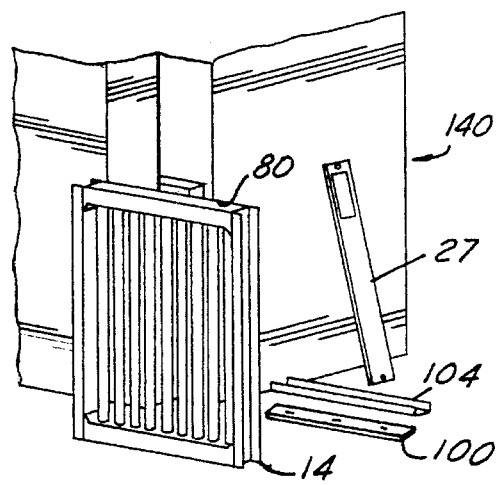
FIG. 9 is a fragmentary perspective view of the furnace, with the media carrier assembly rotated 90° and placed on the floor adjacent the furnace and further illustrating the carrier lid and foam seal removed to expose the trough and the entrances to the tubes of the media carrier assembly.
Figure 10:
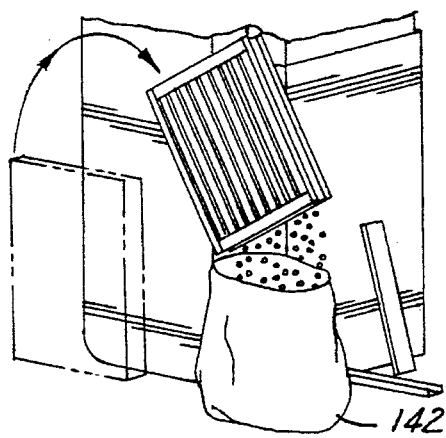
FIG. 10 is a fragmentary perspective view of the furnace showing the manner in which the adsorber carrier assembly is turned upside down so as to discharge the pelletized activated carbon and adsorbed pollutants into a collecting bag.
Figure 11:
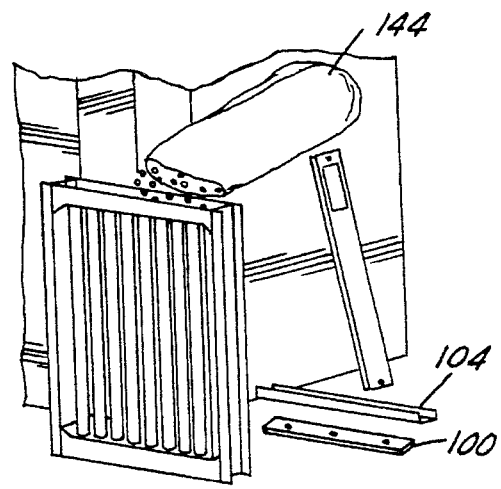
FIG. 11 is a fragmentary perspective view of the furnace and illustrating the manner of pouring fresh pelletized activated carbon evenly into the trough of the media carrier assembly and to thereafter fill the adsorber tubes using either a brush or the fingers.
Figure 12:
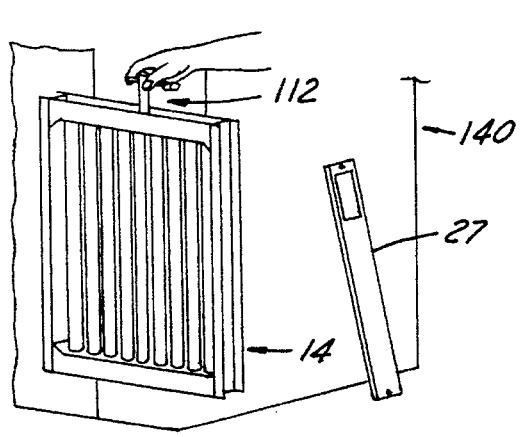
FIG. 12 illustrates the manner of weighing the adsorber media carrier assembly after having replaced the foam seal, lid and thumb screws so as to lock the activated carbon within the adsorber tubes.
Figure 13:
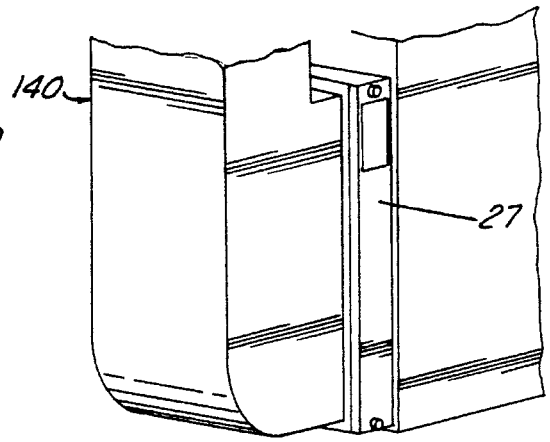
FIG. 13 is a fragmentary perspective view of the furnace, with the carbon media carrier assembly reinstalled in the air purifier cabinet within the furnace.

FIGS. 8–13 inclusive illustrate the steps for the care and maintenance of the activated carbon air purifier 10. As shown in FIG. 8, the air purifier 10 is removed from the furnace 140 by initially removing the thumb screws 29 and removing the cover 27. Thereafter the media carrier assembly 14 is slid out of the cabinet assembly 12. The media carrier assembly 14 is then placed on the floor adjacent to furnace 140 and the carrier lid or cover 104 and foam seal 100 are removed from the trough 80 as shown in FIG. 9. The activated carbon adsorption media should be changed immediately after the heating season and after the cooling season. Thus, in order to empty the media carrier assembly 14, the assembly 14 is tuned up-side down thereby dumping the used activated carbon particles into a plastic trash bag 142. It may be necessary to lightly tap the carrier 14 in order to loosen the carbon from all of the adsorber tubes 90. Thereafter it is necessary to refurnish the media carrier 14 with activated carbon. The carrier 14 is placed on the floor as shown in FIG. 11 and carbon is directed from the bag 144 into the trough 80. The carbon particles are moved into the unfilled tubes 90 using a brush or the person's fingers. It may be necessary to gently tap the carrier 14 on the top in order to settle the carbon into the tubes 90 to fill same. Once all of the tubes 90 have been filled with fresh carbon, the foam seal 100, lid 104 and thumb nuts 106 are replaced. As an optional feature of this invention, the scale mechanism 112 is used to weigh the carrier assembly 14 as shown in FIG. 12. The weight is recorded. Thereafter the media assembly 14 is reinstalled into the air purifier cabinet assembly 12 as shown in FIG. 13.

FIG. 17 shows a furnace 150 with a carbon air purifier 10 in the entrance duct 152, with an outlet duct 153 leading from the furnace 150. FIG. 18 is similar to FIG. 17 with the exception that a particulate filter 154 is located adjacent to and upstream from the carbon air purifier 10 in the entrance duct 152. The carbon air purifier 10 and particulate filter 154 work in combination to remove the various contaminants. FIG. 19 illustrates a furnace 160 having a carbon air purifier 10 and a particular filter 154 upstream with a pair of transition ducts 166, 168 provided.

The air purifier 10 of the present invention is designed for installation in the return air duct of any forced air heating and cooling system and for use in systems up to 2,000 CFM. For higher air flows, additional units may be required. When the activated carbon air purifier 10 is used with a high efficiency particulate air cleaner of the type illustrated in FIGS. 17–19 inclusive, it is recommended that the air purifier 10 be mounted downstream of the particulate filter to prevent the carbon columns from becoming clogged with household dust.

The present invention has the advantage of being able to easily replace the screen adsorber tubes 90 in the event of damage. In addition, the use of the trough 80 facilitates the carbon filling procedure. Also, the use of I-sections and channel sections provide requisite strength for the media carrier assembly 14. The use of studs and thumb nuts allow the replacement of the activated carbon without the use of special tools.

What I claim is:

1. An air purifier for use in a forced air heating and cooling system comprising:

a cabinet assembly having a front side, a rear side and a peripheral frame, with said front and rear sides being open to permit air to flow therethrough;

an adsorber media carrier assembly located within said cabinet assembly between said front and rear sides to intercept and clean the air flowing through said cabinet assembly;

said adsorber media carrier assembly comprising a frame, having a pair of parallel and spaced apart rails each having a pair of end portions and a pair of parallel and spaced apart tube carrying members located, respectively, between the end portions of said rails;

said tube carrying members each having a pair of rows of tubular sockets, with the tubular sockets of one row of the one tube carrying member being aligned with the tubular sockets in one row of the other tube carrying member and the tubular sockets of the other row of said one tube carrying member being aligned with the tubular sockets in the other row of said other tube carrying member; and a plurality of adsorber tubes, each of generally the same length, made from porous material and adapted to carry pelletized adsorbent media, said tubes having the ends thereof carried by said rows of aligned tubular sockets, said adsorber tubes in each row being spaced apart in a direction which is perpendicular to said rails, the air flowing through said cabinet assembly striking and impinging on said adsorber tubes and adsorbent media in order to purify the air.

2. The air purifier defined in claim 1 wherein each of said adsorber tubes is made from woven wire cloth.

3. The air purifier defined in claim 1 wherein the sockets provided in one of said tube carrying members are closed while the tubular sockets provided in the other of said tube carrying members are open to permit loading and removal of the pelletized adsorbent media from the adsorber tubes.

4. The air purifier defined in claim 1 wherein each of said rails is in the form of a channel-shape member having a base and a pair of flanges, with said base attached on opposite ends to said tube carrying members.

5. The air purifier defined in claim 1 wherein each of said tube carrying members is made from a plastic material and includes a bottom wall having a peripheral trough which extends around the periphery thereof.

6. The air purifier defined in claim 5 wherein the tubular sockets provided in one of said tube carrying members are located on one side of said bottom wall and have corresponding openings extending through said bottom wall to the other side thereof, said openings being surrounded by said trough to permit loading and unloading of pelletized adsorbent media relative to said absorber tubes.

7. The air purifier defined in claim 5 wherein the tubular sockets provided in the other of said tube carrying members are located on one side of said bottom wall, said bottom wall being solid throughout its extent, and a spring biased scale mounted in the trough of said other tube carrying member.

8. The air purifier defined in claim 1 wherein said peripheral frame of said cabinet assembly has four sides, with one side being open to permit insertion and removal of said absorber media carrier assembly relative to the interior thereof; a closure element to cover said one side; and means for removably securing said closure element to said peripheral frame to close said one side.

9. The air purifier defined in claim 8 wherein the other three sides of said peripheral frame are formed from channel shaped members, each channel member having a base and a pair of flanges which form a track for the corresponding edges of said adsorber media carrier assembly when located within said cabinet assembly.

10. The air purifier defined in claim 1 wherein the ends of said adsorber tubes are received within the confines of said sockets.

11. The air purifier defined in claim 1 wherein said adsorber tubes and corresponding sockets are staggered in said adsorber media carrier assembly so that the air moving through the cabinet assembly always impinges on an adsorber tube thus reducing the pressure drop.

12. The air purifier defined in claim 1 wherein one of the tube carrying members is provided with a weighing device which can be used to weigh the absorber media carrier assembly before and after the carrier assembly has been used in a forced air heating and cooling system to determine the amount of contaminant removed from the air by the adsorber tubes during a heating or a cooling season.

13. The air purifier defined in claim 12 wherein the other of said tube carrying members is made from a plastic material and includes a base with a peripheral flange extending around the periphery thereof, said tubular sockets being integrally connected to one side of said base and the other side of said base including a pair of spaced apart mounting lugs, said weighing device including a pair of telescopically arranged cylinders, a spring interposed between said cylinders, with the inner cylinder having a scale thereon, pivot means for connecting the inner cylinder to said mounting lugs, one end of said spring being connected to said pivot means, and a handle on said outer cylinder to which the other end of said spring is attached.

14. The air purifier defined in claim 13 wherein an additional pair of lugs is provided on the base of said other tube carrying member to receive the ends of said handle when said weighing device is not in use.

15. The air purifier defined in claim 1 wherein the pelletized adsorbent media is pelletized activated carbon.

* * * * *